(12) United States Patent
Irving et al.

(10) Patent No.: US 8,004,260 B2
(45) Date of Patent: Aug. 23, 2011

(54) METHOD AND APPARATUS FOR MULTI-STAGE POWER SUPPLIES

(75) Inventors: Brian T. Irving, Hillsborough, NC (US); Milan M. Jovanović, Cary, NC (US); Sheng-Hua Li, Taoyuan County (TW); Yung Sheng Yeh, Taoyuan County (TW); Chi-Hsing Huang, Taoyuan County (TW)

(73) Assignee: DELTA Electronics, Inc., Neihu, Taipei (TW)

( * ) Notice: Subject to any disclaimer, the term of this patent is extended or adjusted under 35 U.S.C. 154(b) by 0 days.

(21) Appl. No.: 12/412,099

(22) Filed: Mar. 26, 2009

(65) Prior Publication Data
US 2010/0246220 A1    Sep. 30, 2010

(51) Int. Cl.
G05F 1/00    (2006.01)
(52) U.S. Cl. .................... 323/282; 323/285
(58) Field of Classification Search .............. 323/271, 323/299, 344, 351, 273–275, 282–285, 288; 363/15, 34, 65
See application file for complete search history.

(56) References Cited

U.S. PATENT DOCUMENTS

| 5,289,361 A | 2/1994 | Vinciarelli |
| 5,349,284 A | 9/1994 | Whittle |
| 5,406,192 A | 4/1995 | Vinciarelli |
| 6,504,497 B2 * | 1/2003 | Jang et al. ............... 341/125 |
| 2002/0196006 A1 * | 12/2002 | Hwang ............... 323/288 |
| 2009/0085546 A1 * | 4/2009 | Phadke et al. ............... 323/284 |
| 2009/0097286 A1 * | 4/2009 | Lin et al. ............... 363/65 |

* cited by examiner

*Primary Examiner* — Adolf Berhane
*Assistant Examiner* — Emily Pham
(74) *Attorney, Agent, or Firm* — Venable LLP; Robert S. Babayi; Christopher Ma

(57) ABSTRACT

A power supply having an specified hold-up time to take a input voltage and convert it to an output voltage, comprising: a first power stage to receive the input voltage; a second power stage to generate the output voltage and an output current; an intermediate charge storage device coupled between the first and second power conversion stages providing an intermediate output voltage in response to the input voltage; and a controller that controls the intermediate output voltage according to a voltage function that is associated with the hold-up time.

17 Claims, 9 Drawing Sheets

METHOD AND APPARATUS FOR MULTI-STAGE POWER SUPPLIES

FIELD OF THE INVENTION

This invention generally relates to a method and apparatus to achieve efficiency optimization of multi-stage power supplies by adaptive control of the intermediate voltage.

BACKGROUND

Until recently, efficiency increases of power conversion circuits were primarily driven by increased power density requirements. Generally, it is well known that to increase power density, incremental improvements in full-load efficiency must be made in order to ensure that the thermal performance is not adversely affected. However, today, the power supply industry is at the beginning of a major focus shift that puts efficiency improvements across the entire load range in the forefront of customers' performance requirements. This focus on efficiency has been prompted by economic reasons and environmental concerns caused by the continuous, aggressive growth of the Internet infrastructure and a relatively low energy efficiency of its power delivery system. In fact, the environmental concerns have prompted Environmental Protection Agency (EPA) to revise its Energy Star specifications for power supply efficiencies by defining the minimum efficiencies from full load down to 20% of full load. However, major computer, telecom, and network-equipment manufacturers are already demanding light-load efficiencies exceeding the latest Energy Star specifications and also are extending these requirements down to 10% and, even 5% loads.

In general, the efficiency of power conversion circuits at heavy loads is determined by conduction losses of semiconductor and magnetic components, whereas the efficiency of these power conversion circuits at light loads are primarily determined by switching losses of semiconductors, core losses of magnetics, and drive losses of semiconductor switches. Because switching and drive losses of semiconductor switches and core losses of magnetic components are almost independent of the load current, a typical efficiency curve as a function of the load current exhibits a steep decline as the load current decreases within 20-30% of the full load current. In fact, for a typical power converter, the light load efficiency, e.g., efficiency at 10%, is significantly lower than that at full load.

Generally, minimization of the conduction losses to optimize the full-load efficiency requires maximization of the silicon area and minimization of the resistance of copper conductors. Specifically, the minimization of the semiconductor conduction loss calls for the selection of MOSFETs with minimum on-resistances and rectifiers with minimum forward voltage drops, whereas the conduction loss of magnetic components such as input- and output-filter inductors, transformers, and interconnect losses, are minimized by reducing the resistance of copper conductors, i.e., by shortening the length and increasing the cross-section of wires and PCB traces. The minimization of core losses of magnetic components, switching losses of semiconductors, and drive losses is based on the selection of the optimal switching frequency and the use of low-loss magnetic materials, MOSFET switches with inherently lower switching losses, and rectifiers with a low reverse-recovery charge and/or by employing various soft-switching techniques that substantially reduce switching losses of semiconductors.

In general, established efficiency optimization techniques for power supplies are very often incapable of delivering an efficiency curve that meets customers' expectations across the entire load range. This is especially true for alternating current (AC)/direct current (DC), e.g., off-line, power supplies intended for high-power applications. In this case, it is a common practice to resort to power-supply-level power management techniques to further improve partial-load efficiencies. Generally, these power-supply-level power management techniques are based on changing an operation mode according to the load current and/or input voltage conditions. Conventional power management techniques may include variable switching frequency control, bulk-voltage reduction technique, phase-shedding technique, and "burst"-mode operation technique. While all these load-activity-based power management techniques have been implemented using analog technology, the current rapid employment of digital technology in power conversion applications has made their implementation much easier.

In off-line converters that require an active power-factor-correction (PFC) front-end, reduction of the energy-storage (bulk) voltage was extensively used to improve the efficiency over the line voltage range. This method is based on the fact that the switching losses in semiconductor components such as MOSFET switches and fast-recovery diode rectifiers are reduced if the voltage that they need to switch off is reduced. In a typical universal-line (e.g., 90-264 $V_{rms}$) AC/DC power supply with a PFC front end, the bulk voltage is set at a lower value at a low line voltage, and increased, either linearly or nonlinearly, to a higher value as the peak of the line voltage increases. The bulk capacitor value is determined such that the bulk capacitor can support the full power for a specified hold-up time (usually in the 12-ms to 20-ms range) at the minimum bulk voltage value. The range of the bulk voltage is limited by the regulation-range of the downstream DC/DC output stage.

Known technique disclosed in U.S. Pat. No. 5,349,284 positions the intermediate bulk voltage based solely on the peak of the input voltage. In other words, the intermediate bulk voltage is set greater than and proportional to the peak input voltage in order to improve the efficiency of the PFC boost stage over the universal line range (i.e., 65-265 $V_{AC}$).

Known techniques disclosed in U.S. Pat. No. 5,289,361 and U.S. Pat. No. 5,406,192 position the intermediate bulk voltage based on the input voltage and the operating range of a load converter. In general, the intermediate bulk voltage is always set higher than the peak input voltage, and is adjusted either linearly or nonlinearly between two limits that are chosen based on the voltage operating range of a load converter.

Although the described techniques have led to an improvement in efficiency over a wide line voltage range, they suffer from some major drawbacks that limit their area of application. Namely, they do not take advantage of the fact that the intermediate bulk voltage can be lowered as the output power decreases, leading to a significantly reduced partial-load efficiency. Another major drawback of the known techniques is that in applications which have a hold-up time requirement, the bulk capacitor value and volume is excessively large, since it must store enough energy at the minimum intermediate bulk voltage to permit the load converters to regulate the output voltage during the hold-up time. As the line voltage increases and the intermediate bulk voltage is increased by the controller, or as the output power decreases, the bulk capacitor stores superfluous energy which is unnecessary to meet the specifications. Moreover, the volume of the bulk capacitor is determined largely by the maximum intermediate bulk voltage value.

Another major concern with the described intermediate bulk-voltage reduction and stage-shedding techniques described is the dynamic performance. Specifically, their ability to restore full-power capability without output disturbance or other performance deterioration when the load suddenly changes from light load to full load.

In this invention, implementations of power converters that offer maximized light-load efficiencies without the limitations of prior-art techniques are described.

SUMMARY

In this invention, methods of maintaining high efficiency of power converters across the entire load range and their implementations are disclosed. Specifically, the methods of this invention substantially increase the conversion efficiency at light loads by minimizing switching losses through use of an adaptive intermediate bulk voltage, which is varied as a function of the output power, the input voltage, and the hold-up time requirement.

The methods of present invention are applicable to any power conversion circuit. Specifically, it is applicable to isolated and non-isolated, single-stage and multi-stage, AC/DC, DC/DC, DC/AC, and AC/AC power supplies.

The present invention is better understood upon consideration of the detailed description below and the accompanying drawings.

DETAILED DESCRIPTION OF THE EMBODIMENTS

Exemplary embodiments are discussed in detail below.

Figure 1:
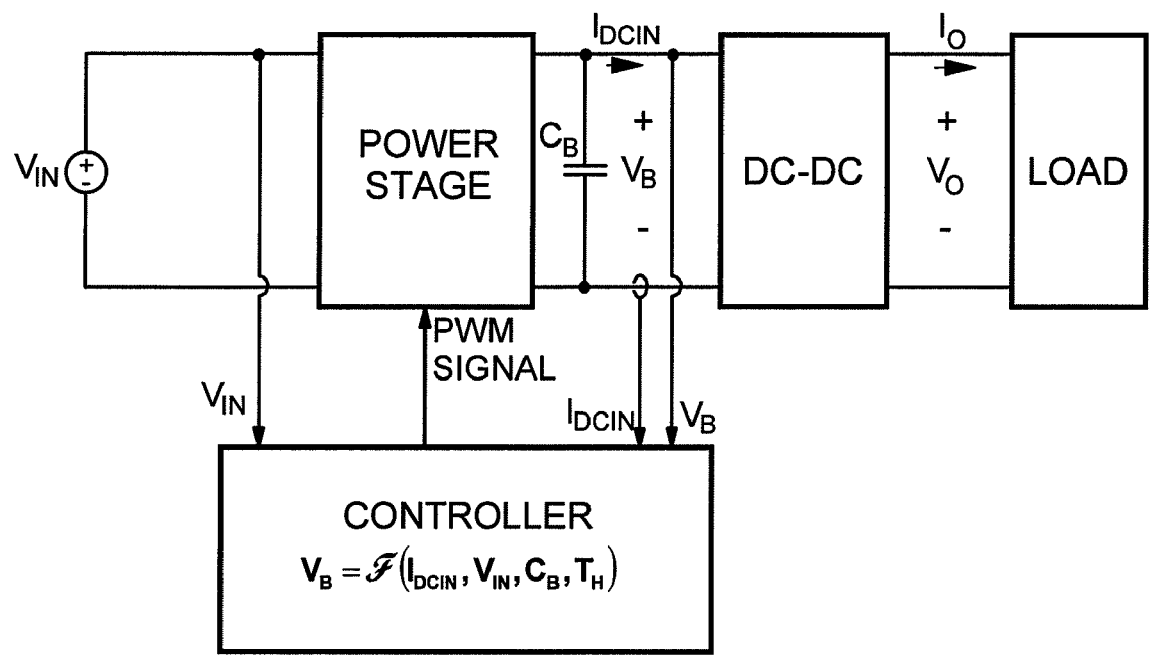
FIG. 1 shows a block diagram of an exemplary embodiment according to the current invention.

A block diagram of the preferred embodiment of the present invention that maximizes the light-load efficiency of a power converter is shown in FIG. 1. The power processor in FIG. 1 that supplies power to a load consists of a power converter, temporary energy-storage and power conditioning circuit, a control circuit, and a DC-DC load converter.

The intermediate bulk voltage $V_B$ is set by the controller, and is determined as a function of the DC-DC load converter input current $D_{DCin}$, input voltage $V_{IN}$, bulk capacitor $C_B$, and required hold-up time $T_H$. Generally, as the output power of the power stage decreases (i.e., as the product of bulk voltage $V_B$ and current $D_{DCin}$ decreases), intermediate bulk voltage $V_B$ is decreased by the controller to a value no less than the peak of input voltage $V_{IN}$. In addition, the set point of the intermediate bulk voltage $V_B$ is dependent on the bulk capacitor value ($C_B$) and the hold-up time requirement ($T_H$), such that in the event of a line drop out, the energy stored in the bulk capacitor $C_B$ supplies the DC-DC load converter for the required hold-up time $T_H$.

Figure 2:
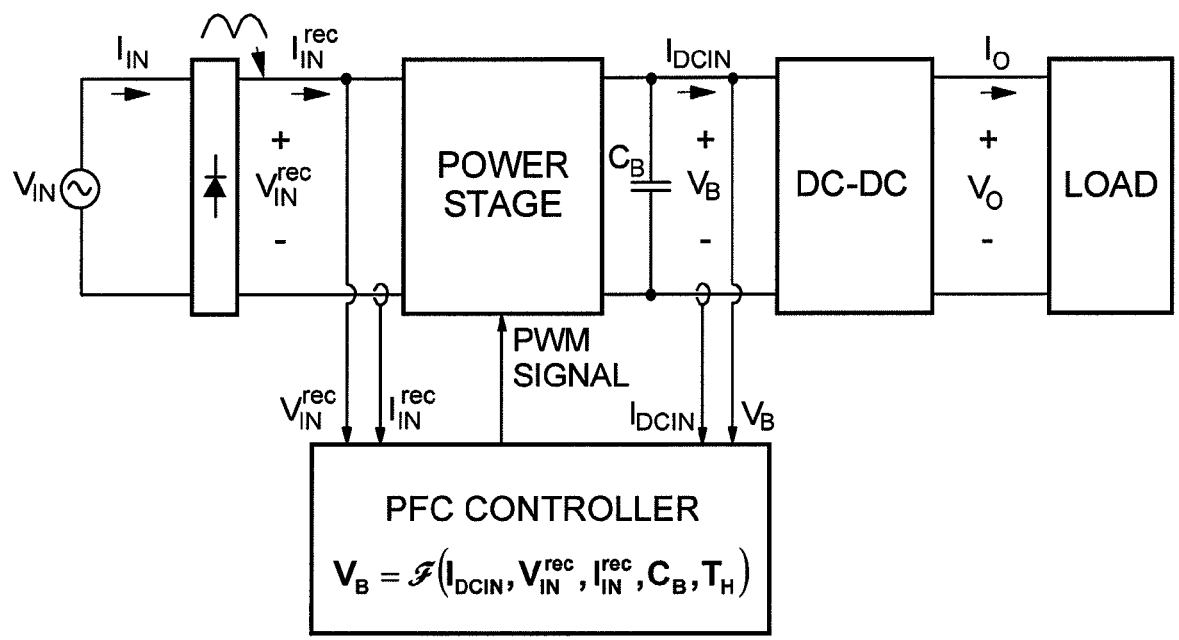
FIG. 2 shows a block diagram of another exemplary embodiment according to the current invention.
Figure 3:
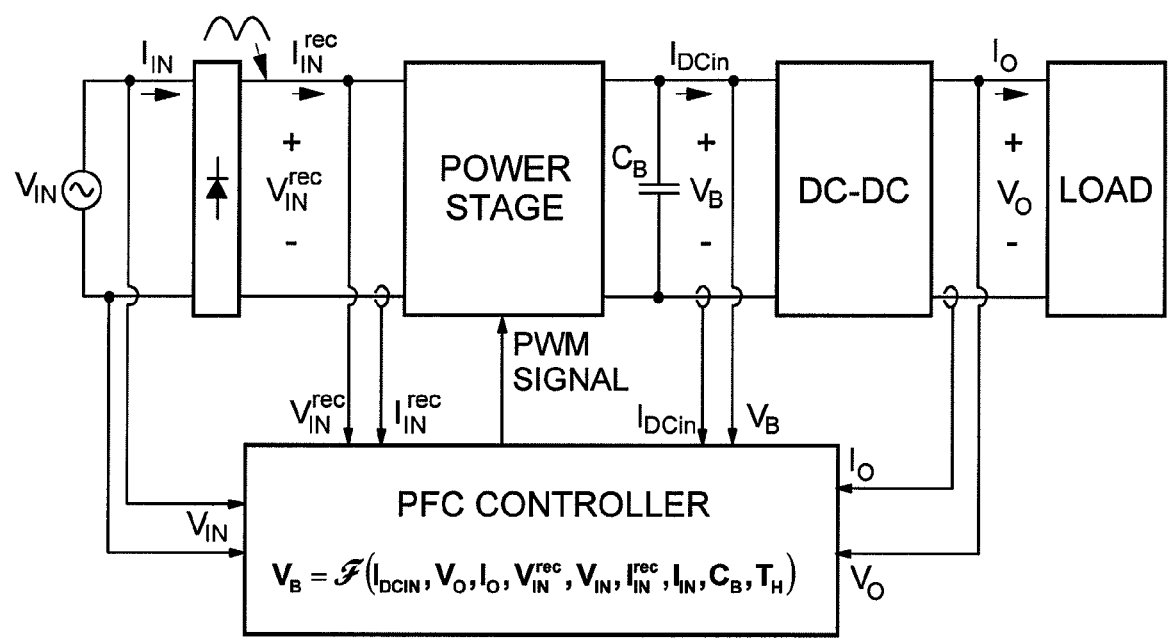
FIG. 3 shows a block diagram of still another exemplary embodiment according to the current invention.

Input voltage $V_{IN}$ can be either a DC input as shown in FIG. 1, or a rectified AC input as shown in the exemplary embodiment given in FIG. 2. In applications with an AC input, the power stage is also controlled to shape rectified input current $I_{IN}^{rec}$ to follow rectified AC input voltage $v_{IN}^{rec}$. Sensing of input voltage $V_{IN}$ can be done after the bridge rectifier, as shown in the embodiment of FIG. 2, or directly, as shown in the exemplary embodiment shown in FIG. 3. Similarly, sensing of the power stage output current can be done either directly as in the exemplary embodiments shown in FIGS. 1 and 2, or indirectly at the output of the DC-DC load converter, as shown in the exemplary embodiment shown in FIG. 3. Finally, the power stage output power can be determined from the product of intermediate bulk voltage $V_B$ and current $I_{DCin}$, directly, or indirectly by taking the product of sensed output voltage $V_O$ and sensed output current $I_O$.

Generally, the highest power supply efficiency is obtained when intermediate bulk voltage $V_B$ is minimal. When the power stage is implemented with a boost converter, intermediate bulk voltage $V_B$ must be higher than the input voltage and high enough to store the required energy in the bulk capacitor so that in the event of a line-drop out the power supply output voltage can remain within regulation for the required hold-up time ($T_H$). In order to remain within regulation, intermediate bulk voltage $V_B$ must be greater than minimum DC-DC load converter input voltage $V_{DC}^{min}$ which is dependent on the design of the DC-DC converter.

In applications which have a hold-up time requirement, the minimum intermediate bulk voltage value needed to deliver power to the load converter (referred to hereinafter as voltage $V_{B1}$) for the duration of a line drop-out is determined from the output power $P_B$, where $P_B$ is the output power of stage 1. Output power $P_B$ can be written as a function of the difference in the stored energy within the bulk capacitor $C_B$, i.e., the energy difference between the moment prior to a line drop-out and the remaining energy within the bulk capacitor after hold-up time $T_H$ has passed, divided by hold up time $T_H$:

$$P_B = \frac{\Delta E}{T_H} = \frac{\frac{1}{2}C_B V_{B1}^2 - \frac{1}{2}C_B V_{DC}^{min2}}{T_H} = \frac{C_B}{2T_H}\left(V_{B1}^2 - V_{DC}^{min2}\right) \quad (1)$$

where the minimum DC-DC load converter voltage $V_{DC}^{min}$ is a design limit based on the operating range of the load converter. Voltage $V_{B1}$ is therefore, $$V_{B1} = \sqrt{\underbrace{\frac{2T_H}{C_B}}_{A} P_B + \underbrace{V_{DC}^{min2}}_{B}} = \sqrt{A \cdot P_B + B} \quad (2)$$

Figure 4:
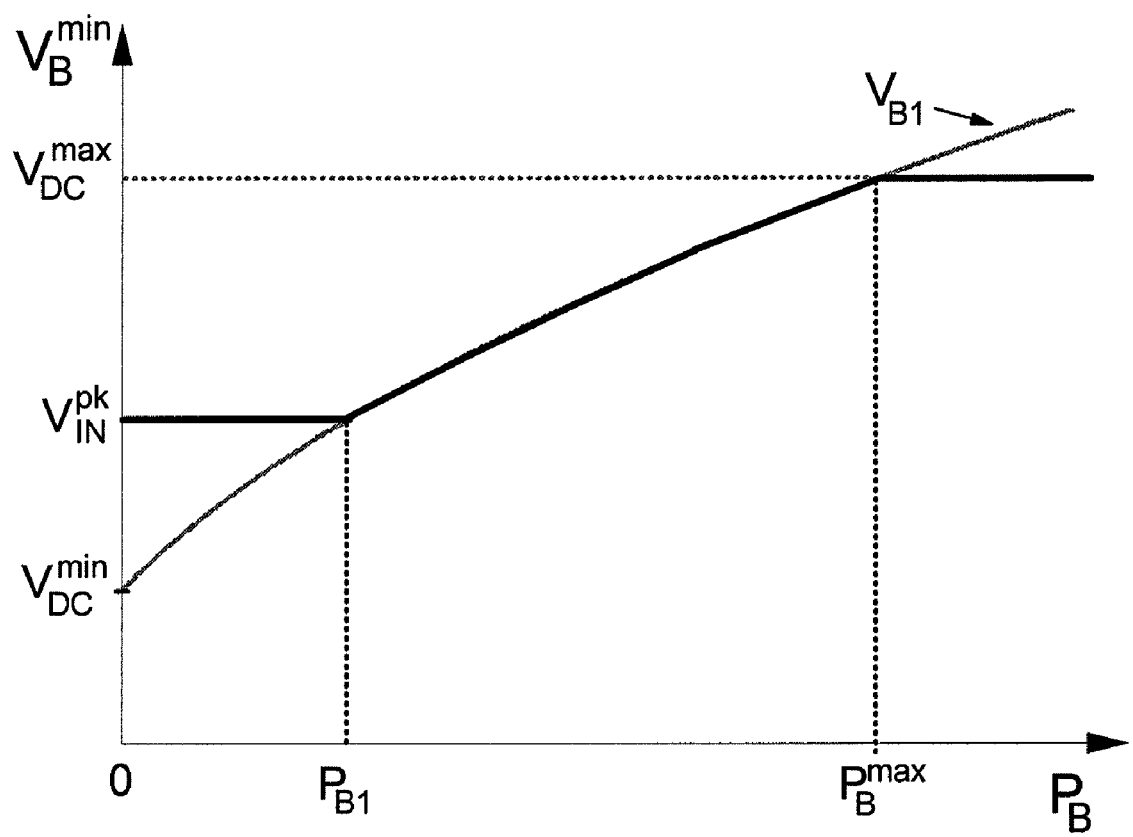
FIG. 4 illustrates the minimum intermediate bulk voltage $V_B^{min}$ as a function of the output power $P_B$ and peak input voltage $V_{IN}^{pk}$.

It should be noted that voltage $V_{B1}$ does not depend on input voltage $V_{IN}$. For the boost converter with AC input, minimum intermediate bulk voltage $V_B^{min}$ in needs to be greater than peak input voltage $V_{IN}^{pk}$, while for any converter, the maximum intermediate bulk voltage is limited by maximum DC-DC load converter voltage $V_{DC}^{max}$. The minimum intermediate bulk voltage $V_B^{min}$ is therefore:

$$V_B^{min} = \begin{cases} \alpha \cdot V_{B1} & \text{if } V_{IN}^{pk} \le \alpha \cdot V_{B1} < V_{DC}^{max} \\ V_{IN}^{pk} & \text{if } \alpha \cdot V_{B1} < V_{IN}^{pk} \\ V_{DC}^{max} & \text{if } \alpha \cdot V_{B1} > V_{DC}^{max} \end{cases} \quad (3)$$

which is illustrated in FIG. 4 and where α is a constant of proportionality equal to or greater than one.

Figure 5:
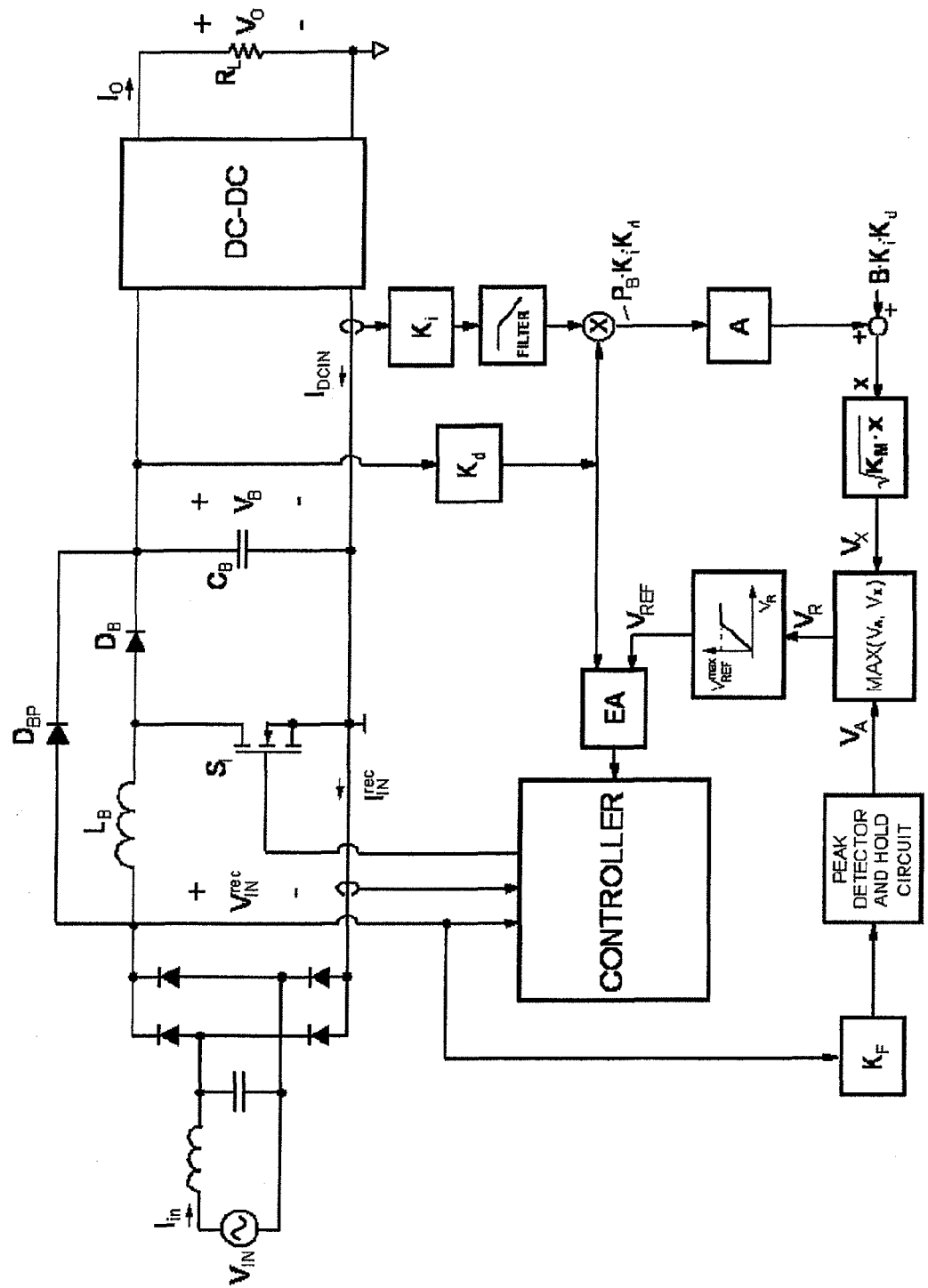
FIG. 5 shows an exemplary embodiment, according to the current invention, of a circuit implementation utilizing a boost converter with an AC line voltage.

An exemplary embodiment of a circuit implementation utilizing the boost converter with an ac line voltage is shown in FIG. 5. Input current shaping is done by the control through sensing of rectified line voltage $v_{IN}^{rec}$ and rectified input current $I_{IN}^{rec}$, whereas reference voltage $V_{REF}$, connected at an input of error amplifier EA, is dependent on rectified input voltage $v_{IN}^{rec}$, intermediate bulk voltage $V_B$ through gain $K_d$, and current $I_{DCin}$ through gain $K_i$. It should be noted that voltage $V_B$ can also be sensed independently from the voltage feedback loop. Power stage output power $P_B$ is shown as the product of intermediate bulk voltage $V_B$ and filtered dc-dc load converter input current $<D_{DCin}>$. Sensed output power $P_B$ is then multiplied by constant gain A and summed with constant $B \cdot K_i \cdot K_d$, to produce signal X, which is then multiplied by gain $K_M$, where gain $K_M = K_d/K_i$. Voltage $V_X$ is then equal to the square root of the product of gain $K_M$ and signal X, i.e., $V_X = \sqrt{K_m \cdot x}$. Input voltage $v_{IN}^{rec}$ is sensed through gain $K_F$, where $K_F = K_d$, and the peak of the sensed input voltage is detected and held, which is represented by voltage $V_A$. Reference voltage $V_{REF}$ is determined by a maximum voltage detector, which passes the highest voltage input (i.e., $V_{REF} = V_A$ if $V_A > V_X$ and $V_{REF} = V_X$ if $V_X > V_A$) which is represented by voltage $V_R$, and that is clamped to voltage $V_{REF}^{max}$ by a voltage limiter.

Implementing a square-root function is computationally inefficient using digital technology, and is generally very difficult to implement using analog technology. An approximation can be made to simplify the implementation by using a first order Taylor series expansion of voltage $V_B$, which yields $$V_{B1approx1}^{min} = \frac{V_{REF}^{min}}{K_d} + \frac{H_{PV}}{K_d} P_B \quad (4)$$

where $$V_{REF}^{min} = K_d \left( \sqrt{\frac{T_H}{C_B} P_B^{max} + V_{DC}^{min2}} - \frac{T_H}{2C_B \sqrt{\frac{T_H}{C_B} P_B^{max} + V_{DC}^{min2}}} P_B^{max} \right) \quad (5)$$

$$H_{PV} = K_d \frac{T_H}{C_B \sqrt{\frac{T_H}{C_B} P_B^{max} + V_{DC}^{min2}}} \quad (6)$$

Minimum intermediate bulk voltage $V_B^{min}$ is then approximated with $V_{B1APP1}^{min}$, $$V_{B1APP1}^{min} = \begin{cases} V_{B1approx1}^{min} & \text{if } V_{IN}^{pk} \le V_{B1approx1}^{min} < V_{DC}^{max} \\ V_{IN}^{pk} & \text{if } V_{B1approx1}^{min} < V_{IN}^{pk} \\ V_{DC}^{max} & \text{if } V_{B1approx1}^{min} > V_{DC}^{max} \end{cases} \quad (7)$$

Figure 6:
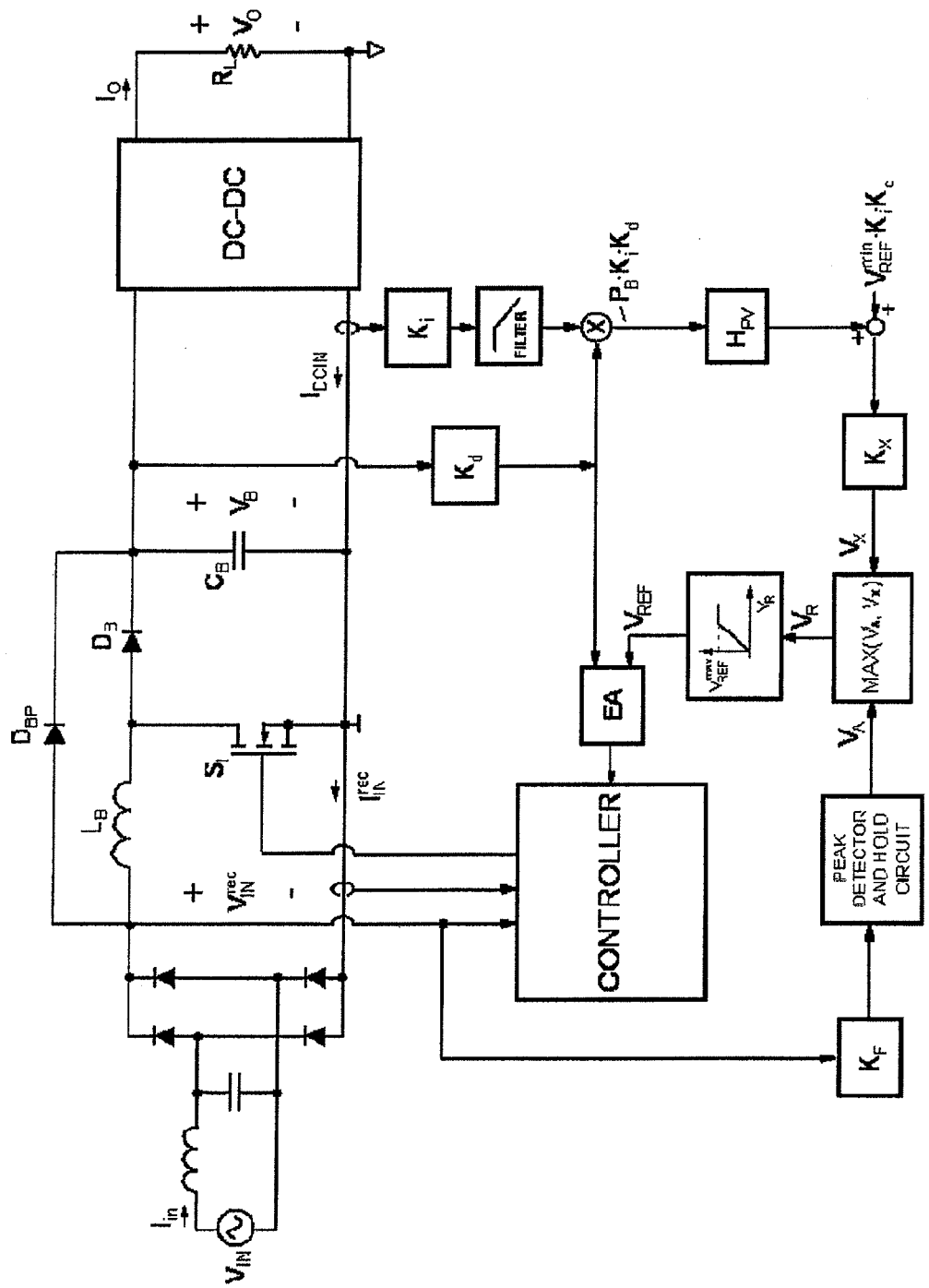
FIG. 6 shows another exemplary embodiment, according to the current invention, of a circuit implementation utilizing a boost converter with an AC line voltage.

An embodiment of a circuit implementation which realizes Eq. 7 utilizing the boost converter with an ac line voltage is shown in FIG. 6. As before, power stage output power $P_B$ is the product of intermediate bulk voltage $V_B$ and average current $<I_{DCin}>$. Sensed output power $P_B$ is weighted by gain block $H_{PV}$, and summed with minimum error reference voltage $V_{REF}^{min} \cdot K_i \cdot K_d$, which is represented by voltage $V_X$. As in the exemplary embodiment shown in FIG. 5, the peak input voltage is represented by voltage $V_A$, and reference voltage $V_{REF}$ is determined by a maximum voltage detector, which passes the highest voltage input (i.e., $V_{REF} = V_A$ if $V_A > V_X$, and $V_{REF} = V_X$ if $V_X > V_A$) which is represented by voltage $V_R$, and that is clamped to voltage $V_{REF}^{max}$ by a voltage limiter.

A second order Taylor series expansion leads to a better approximation with a higher level of complexity as expressed in the following Eq. 8:

$$V_{B1approx2}^{min} = \frac{1}{K_d} \left( \sqrt{\frac{T_H}{C_B} P_B^{max} + V_{DC}^{min2}} + \frac{T_H}{C_B} \frac{\left(P_B - \frac{1}{2} P_B^{max}\right)}{\sqrt{\frac{T_H}{C_B} P_B^{max} + V_{DC}^{min2}}} - \frac{T_H^2}{2C_B^2} \frac{\left(P_B - \frac{1}{2} P_B^{max}\right)^2}{\left(\frac{T_H}{C_B} P_B^{max} + V_{DC}^{min2}\right)^{\frac{3}{2}}} \right) \quad (8)$$

It should be noted that maximum output power $P_B^{max}$, hold up time $T_H$, and capacitance $C_B$ are considered constant, and therefore, no additional square-root operations are required.

Minimum intermediate bulk voltage $V_B^{min}$ is then approximated with $V_{BAPP2}^{min}$, $$V_{BAPP2}^{min} = \begin{cases} V_{B1approx2}^{min} & \text{if } V_{IN}^{pk} \le V_{B1approx2}^{min} < V_{DC}^{max} \\ V_{IN}^{pk} & \text{if } V_{B1approx2}^{min} < V_{IN}^{pk} \\ V_{DC}^{max} & \text{if } V_{B1approx2}^{min} > V_{DC}^{max} \end{cases} \quad (9)$$

Figure 7:
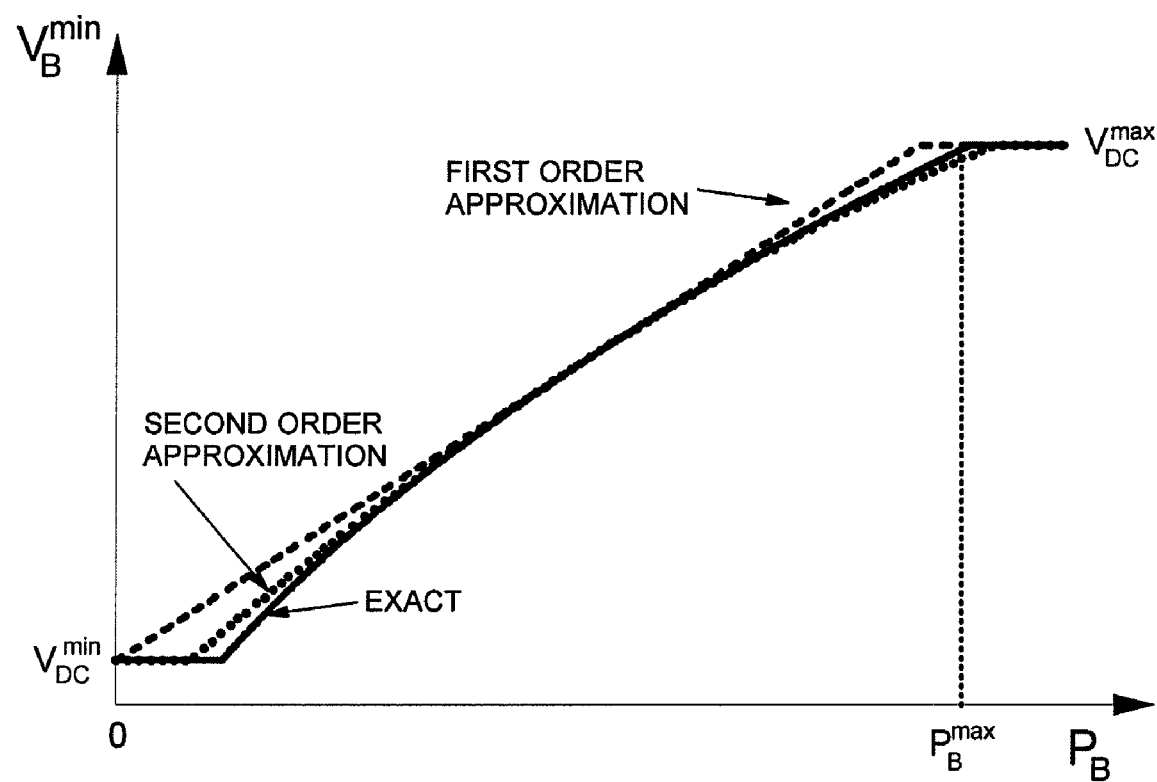
FIG. 7 illustrates the desired minimum intermediate bulk voltage $V_B^{min}$ as compared to realizations using the first and second-order Taylor series expansions.

The variation of minimum intermediate bulk voltage $V_B^{min}$ with power stage output power is compared with both a first and second order Taylor series expansion as shown in the embodiment of FIG. 7. For additional accuracy, embodiments implementing higher-order Taylor series expansions are possible.

Figure 8:
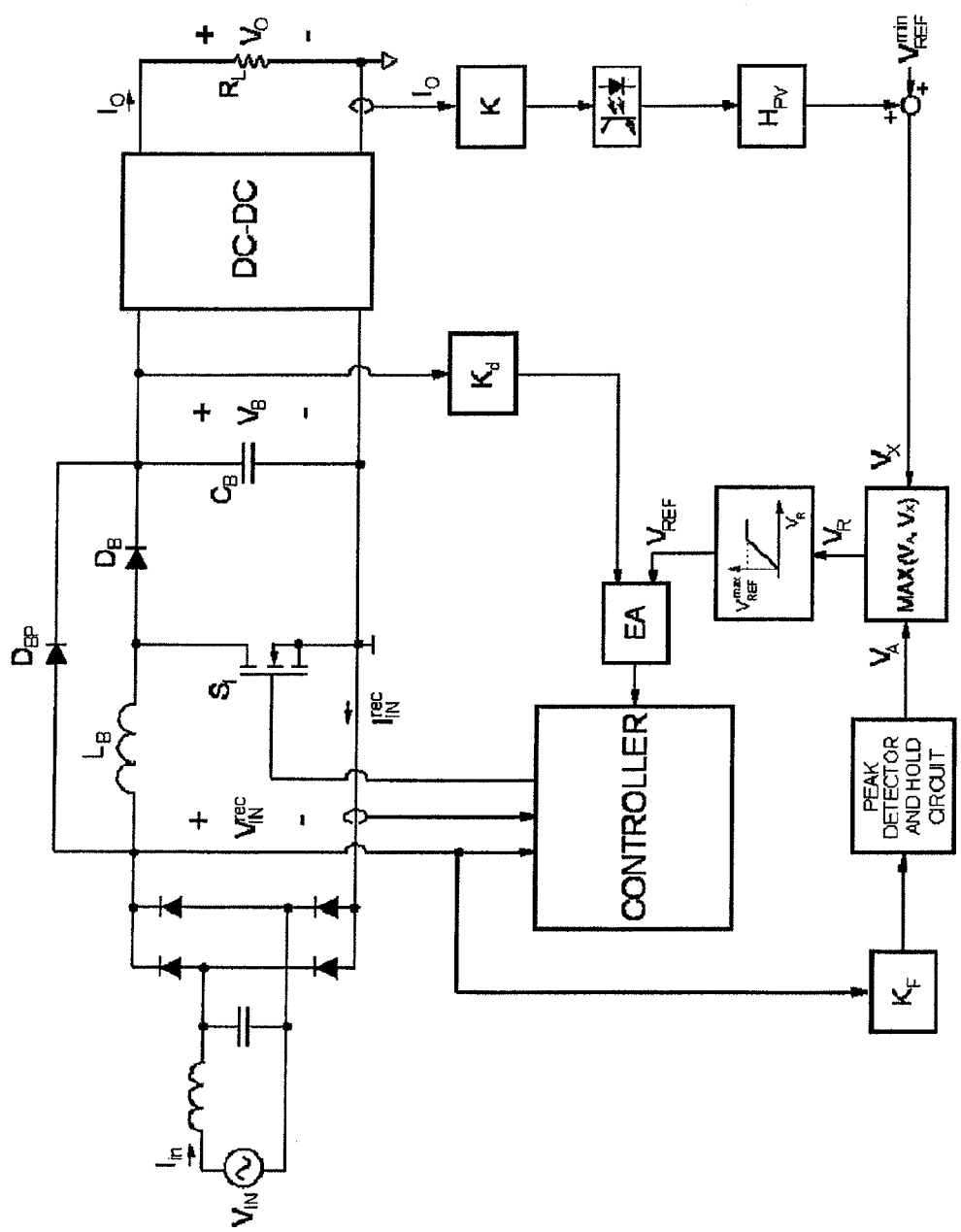
FIG. 8 shows an exemplary embodiment, according to the current invention, which includes a first order Taylor series approximation.

An additional approximation can be made which would remove the necessity of using a multiplier by sensing the DC-DC output current $I_O$, as shown in the embodiment of FIG. 8 which also includes a first-order Taylor series approximation. Since the output voltage is regulated, the value of the output voltage is constant and, therefore, can be included as a scaling factor. It should be noted that the efficiency of the DC-DC converter must also be estimated and included in the scaling factor. Isolation, such as an optocoupler as shown in the embodiment of FIG. 8, is required in some designs.

In FIG. 8, minimum intermediate bus voltage $V_{B1}^{min}$ is approximated as $$V_{B1approx1}^{min} = \frac{V_{REF}^{min}}{K_d} + \frac{H_{PV}}{K_d}KI_o, \quad (10)$$

where $$K = \frac{V_O^{nom}}{\eta_{dc-dc}} \quad (11)$$

and where $V_O^{nom}$ is the nominal output voltage, and $\eta_{dc-dc}$ is the efficiency of DC-DC converter. It is noted that the gain of optocoupler is assumed to be unity.

Figure 9:
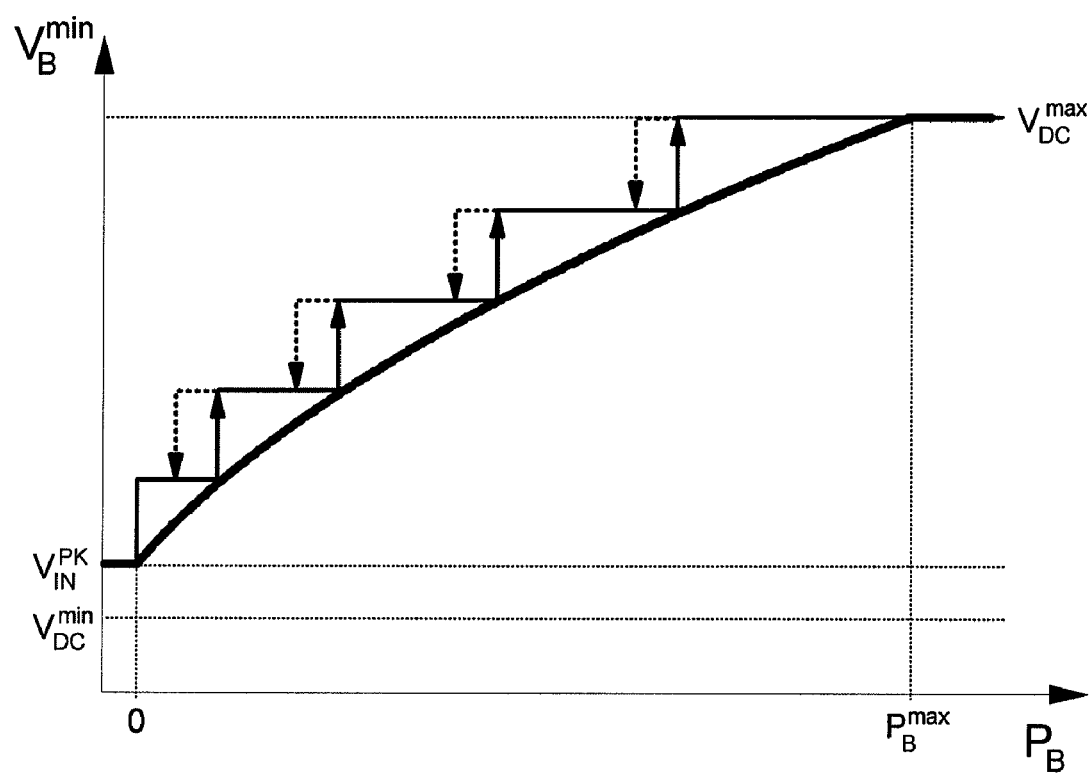
FIG. 9 illustrates both the continuous and discrete realizations of the minimum intermediate bulk voltage $V_B^{min}$.

The change of intermediate bulk voltage $V_B$ can be either a continuous change as shown previously, or a discrete step change, as shown in FIG. 9. Although two discrete steps are possible, generally, the efficiency of the power supply increases as the number of discrete steps increases.

The examples and embodiments described herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims, is intended to cover all such changes and modifications which fall within the true spirit of the invention.

What is claimed is:

1. A power supply having a specified hold-up time that receives an input voltage and provides an output voltage, comprising:
   a first power stage that receives the input voltage;
   a second power stage that generates the output voltage;
   an intermediate charge storage device coupled between the first and second power conversion stages providing an intermediate output voltage in response to the input voltage; and
   a controller that controls the intermediate output voltage during normal operation before line drop-out according to a voltage function that is based on the specified hold-up time.

2. The power supply as set forth in claim 1, wherein the voltage function substantially minimizes the intermediate output voltage.

3. The power supply as set forth in claim 2, wherein minimum intermediate output voltage $V_B^{min}$ is minimized according to the following formula:

$$V_B^{min} = \begin{cases} \alpha \cdot V_{B1} & \text{if } V_{IN}^{pk} \leq \alpha \cdot V_{B1} < V_{DC}^{max} \\ V_{IN}^{pk} & \text{if } \alpha \cdot V_{B1} < V_{IN}^{pk} \\ V_{DC}^{max} & \text{if } \alpha \cdot V_{B1} > V_{DC}^{max} \end{cases}$$

where $V_{IN}^{pk}$ is the peak input voltage, $V_{DC}^{min}$ is a minimum voltage by design, $V_{DC}^{max}$ is a maximum voltage by design, $\alpha$ is a constant of proportionality equal to or greater than one, and $$V_{B1} = \sqrt{\frac{2T_H}{C_B}P_B + V_{DC}^{min2}}$$

where $T_H$ is the specified hold-up time, $C_B$ is the capacitance of the intermediate charge storage device, and $P_B$ is the output power of the first power stage.

4. The power supply as set forth in claim 3, wherein $V_{B1}$ is approximated as an $n^{th}$ order Taylor series expansion of the square root operation.

5. The power supply as set forth in claim 4, wherein the approximation is performed with regard to output power $P_B$ of the first power stage.

6. The power supply as set forth in claim 4, wherein the approximation is performed with regard to the output current of the power supply.

7. The power supply as set forth in claim 1, wherein at least one of said first or second power stages is a power conversion stage.

8. The power supply as set forth in claim 7, wherein said power conversion stage is a switching power conversion stage.

9. The power supply as set forth in claim 8, wherein said switching power conversions stage comprises at least one of a boost converter and a buck converter.

10. The power supply as set forth in claim 9, wherein said power conversion stage comprises a current shaping stage.

11. The power supply as set forth in claim 10, wherein said current shaping stage is a power factor correction (PFC) stage.

12. The power supply as set forth in claim 1, wherein said intermediate charge storage device comprises at least one capacitor.

13. The power supply as set forth in claim 1, wherein the function associated with an output power $P_B$ that is derived from the intermediate bulk voltage and the input current of the second power stage.

14. The power supply as set forth in claim 13, wherein the function is proportional to the output current of the second power stage.

15. The controller as set forth in claim 1, wherein a minimum intermediate bulk voltage is determined using at least one of digital or analog technologies.

16. The power supply as set forth in claim 1, wherein the voltage function is based on the specified hold-up time and output power of the first power stage.

17. The power supply as set forth in claim 16, wherein the voltage function is based on the specified hold-up time, output power of the first power stage, peak input voltage, minimum voltage by design, maximum voltage by design, and capacitance of the intermediate charge storage device.

* * * * *